US010410155B2

(12) United States Patent
Das et al.

(10) Patent No.: US 10,410,155 B2
(45) Date of Patent: Sep. 10, 2019

(54) AUTOMATIC DEMAND-DRIVEN RESOURCE SCALING FOR RELATIONAL DATABASE-AS-A-SERVICE

(71) Applicant: Microsoft Technology Licensing, LLC, Redmond, WA (US)

(72) Inventors: Sudipto Das, Redmond, WA (US); Feng Li, Bellevue, WA (US); Vivek Narasayya, Redmond, WA (US); Arnd Christian König, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 468 days.

(21) Appl. No.: 14/702,644

(22) Filed: May 1, 2015

(65) Prior Publication Data

US 2016/0321588 A1 Nov. 3, 2016

(51) Int. Cl.
*G06Q 10/00* (2012.01)
*G06Q 10/06* (2012.01)
*G06F 11/34* (2006.01)
*G06F 16/21* (2019.01)
*G06Q 20/14* (2012.01)

(52) U.S. Cl.
CPC ... *G06Q 10/06315* (2013.01); *G06F 11/3442* (2013.01); *G06F 11/3452* (2013.01); *G06F 16/217* (2019.01); *G06Q 20/145* (2013.01)

(58) Field of Classification Search
CPC ............ G06Q 10/06315; G06Q 20/145; G06F 11/3442; G06F 11/3452; G06F 16/217
See application file for complete search history.

(56) References Cited

U.S. PATENT DOCUMENTS

| 5,586,219 | A | 12/1996 | Yufik |
| 5,838,968 | A | 11/1998 | Culbert |
| 7,028,158 | B1 | 4/2006 | Beatty et al. |
| 7,136,800 | B1 | 11/2006 | Vega |

(Continued)

FOREIGN PATENT DOCUMENTS

WO 2014206266 A1 12/2014

OTHER PUBLICATIONS

M. Mao, J. Li and M. Humphrey, "Cloud auto-scaling with deadline and budget constraints," 2010 11th IEEE/ACM International Conference on Grid Computing, Brussels, 2010, pp. 41-48. (Year: 2010).*

(Continued)

*Primary Examiner* — William S Brockington, III

(57) ABSTRACT

Architecture that enables a Database-as-a-Service (DaaS) to auto-scale container sizes on behalf of tenants. An abstraction is provided that enables tenants to reason about monetary budget and query latency, rather than resource provisioning. An auto-scaling module automatically determines a container size for a subsequent billing interval based on telemetry that comprises latencies (e.g., waits), resource utilizations, and available budget, for example. A set of robust signals are derived from database engine telemetry and combined to significantly improve accuracy of resource demand estimation for database workloads. In a more specific implementation, resource demands can be estimated for arbitrary SQL (structured query language) workloads in a relational database management system (RDBMS).

20 Claims, 9 Drawing Sheets

(56) References Cited

U.S. PATENT DOCUMENTS

| | | | |
|---|---|---|---|
| 7,640,547 B2 | 12/2009 | Neiman et al. | |
| 8,346,747 B2 | 1/2013 | Liu et al. | |
| 8,386,540 B1 | 2/2013 | McAlister et al. | |
| 8,589,549 B1* | 11/2013 | Vermeulen | G06F 9/50 709/226 |
| 8,782,654 B2 | 7/2014 | Jackson | |
| 8,972,579 B2 | 3/2015 | Iori et al. | |
| 9,052,831 B1 | 6/2015 | Stefani et al. | |
| 9,317,680 B2 | 4/2016 | Carte et al. | |
| 9,450,876 B1 | 9/2016 | Marr | |
| 9,477,710 B2 | 10/2016 | Narasayya et al. | |
| 9,602,426 B2 | 3/2017 | Das et al. | |
| 2002/0107026 A1 | 8/2002 | Agrawal et al. | |
| 2003/0046396 A1 | 3/2003 | Richter et al. | |
| 2007/0226449 A1* | 9/2007 | Akimoto | G06F 9/5077 711/170 |
| 2008/0052719 A1 | 2/2008 | Briscoe et al. | |
| 2008/0225889 A1 | 9/2008 | Truong et al. | |
| 2008/0270459 A1 | 10/2008 | Grewal et al. | |
| 2009/0182605 A1* | 7/2009 | Lappas | G06Q 10/06 705/34 |
| 2009/0327781 A1* | 12/2009 | Tripathi | G06F 9/4818 713/324 |
| 2010/0017506 A1 | 1/2010 | Fadell | |
| 2010/0083248 A1* | 4/2010 | Wood | G06F 9/5077 718/1 |
| 2010/0220683 A1 | 9/2010 | Novak et al. | |
| 2010/0257544 A1 | 10/2010 | Kleban | |
| 2010/0278135 A1 | 11/2010 | Inaida | |
| 2010/0306776 A1 | 12/2010 | Greene | |
| 2011/0075596 A1 | 3/2011 | Moreira et al. | |
| 2011/0119312 A1 | 5/2011 | Chopra et al. | |
| 2011/0126168 A1 | 5/2011 | Ilyayev | |
| 2011/0225017 A1* | 9/2011 | Radhakrishnan | G06Q 10/06315 705/7.25 |
| 2011/0252421 A1 | 10/2011 | Vega | |
| 2011/0264805 A1 | 10/2011 | Breitgand et al. | |
| 2011/0292792 A1 | 12/2011 | Zuo et al. | |
| 2012/0066020 A1 | 3/2012 | Moon et al. | |
| 2012/0102481 A1 | 4/2012 | Mani et al. | |
| 2012/0117242 A1 | 5/2012 | Aoki et al. | |
| 2012/0131591 A1* | 5/2012 | Moorthi | G06Q 10/06 718/104 |
| 2012/0173513 A1 | 7/2012 | Agrawal et al. | |
| 2012/0215918 A1 | 8/2012 | Vasters et al. | |
| 2012/0230238 A1 | 9/2012 | Dalsgaard et al. | |
| 2012/0246319 A1 | 9/2012 | Um et al. | |
| 2012/0265741 A1 | 10/2012 | Moon et al. | |
| 2012/0330954 A1 | 12/2012 | Sivasubramanian et al. | |
| 2013/0003538 A1 | 1/2013 | Greenberg et al. | |
| 2013/0007753 A1 | 1/2013 | Jain | |
| 2013/0080617 A1 | 3/2013 | Driesen et al. | |
| 2013/0086270 A1 | 4/2013 | Nishikawa et al. | |
| 2013/0086273 A1 | 4/2013 | Wray et al. | |
| 2013/0124807 A1 | 5/2013 | Nielsen et al. | |
| 2013/0132057 A1 | 5/2013 | Deng et al. | |
| 2013/0139172 A1 | 5/2013 | An et al. | |
| 2013/0179476 A1* | 7/2013 | Saam | G06F 16/278 707/803 |
| 2013/0179895 A1 | 7/2013 | Calder et al. | |
| 2013/0191523 A1 | 7/2013 | Buck et al. | |
| 2013/0238641 A1 | 9/2013 | Mandelstein et al. | |
| 2013/0254384 A1 | 9/2013 | Wray | |
| 2013/0268914 A1 | 10/2013 | Oslake et al. | |
| 2013/0297655 A1 | 11/2013 | Narasayya et al. | |
| 2013/0326064 A1 | 12/2013 | Gulati et al. | |
| 2013/0346533 A1 | 12/2013 | Agrawal et al. | |
| 2014/0040999 A1 | 2/2014 | Zhang et al. | |
| 2014/0068611 A1 | 3/2014 | McGrath et al. | |
| 2014/0068699 A1 | 3/2014 | Balacheff et al. | |
| 2014/0074641 A1 | 3/2014 | Wang | |
| 2014/0115163 A1 | 4/2014 | Matousek | |
| 2014/0136295 A1 | 5/2014 | Wasser | |
| 2014/0207740 A1 | 7/2014 | Narasayya et al. | |
| 2014/0215487 A1* | 7/2014 | Cherkasova | G06F 9/5083 718/106 |
| 2014/0280948 A1 | 9/2014 | Schmidt et al. | |
| 2014/0280956 A1 | 9/2014 | Shu et al. | |
| 2014/0324647 A1* | 10/2014 | Iyoob | G06Q 40/12 705/30 |
| 2014/0379924 A1 | 12/2014 | Das et al. | |
| 2015/0046279 A1 | 2/2015 | Wang | |
| 2015/0281111 A1* | 10/2015 | Carl | H04L 47/70 709/226 |
| 2016/0103717 A1* | 4/2016 | Dettori | G06F 9/542 719/318 |
| 2016/0274940 A1 | 9/2016 | Birdsall et al. | |
| 2016/0371307 A1 | 12/2016 | Narasayya et al. | |
| 2017/0005515 A1 | 1/2017 | Sanders et al. | |
| 2017/0163554 A1 | 6/2017 | Das et al. | |
| 2018/0314616 A1 | 11/2018 | Savolainen | |

OTHER PUBLICATIONS

"International Search Report and Written Opinion Issued in PCT Application No. PCT/US2016/026289", dated Jul. 13, 2016, 12 Pages.

"An Oracle White Paper: Delivering Database as a Service (DBaaS) using Oracle Enterprise Manager 12c", Retrieved from: <<http://web.archive.org/web/20150319064703/http://www.oracle.com/technetwork/oem/cloud-mgmt/dbaas-overview-wp-1915651.pdf>>, Oct. 1, 2013, 21 Pages.

"AWS | Amazon DynamoDB | FAQs", Retrieved from: <<http://web.archive.org/web/20150407205632/https://aws.amazon.com/dynamodb/faqs/>>, Apr. 7, 2015, 33 Pages.

Arredondo, J. R., "Backspace Cloud Databases and Container-based virtualization", Retrieved from: <<http://c1776742.cdn.cloudfiles.rackspacecloud.com/downloads/pdfs/Rackspace-Cloud-Databases-and-Container-based-Virtualization.pdf>>, Aug. 1, 2012, 6 Pages.

"Auto Scaling", Retrieved on: Feb. 10, 2015 Available at: http://aws.amazon.com/autoscaling/.

"Autoscaler", Retrieved on: Feb. 10, 2015 Available at: http://cloud.google.com/compute/autoscaler/.

Gandhi, et al., "AutoScale: Dynamic, Robust Capacity Management for Multi-Tier Data Centers", In Proceedings of ACM Transactions on Computer Systems, vol. 30, Issue 4, Nov. 1, 2012, 26 pages.

Gong, et al., "PRESS: PRedictive Elastic ReSource Scaling for Cloud Systems", In Proceedings of International Conference on Network and Service Management, Oct. 25, 2010, pp. 9-16.

Huber, et al., "Model-based Self-Adaptive Resource Allocation in Virtualized Environments", In Proceedings of 6th International Symposium on Software Engineering for Adaptive and Self-Managing Systems, May 23, 2011, pp. 90-99.

Nguyen, et al., "AGILE: Elastic Distributed Resource Scaling for Infrastructure-as-a-Service", In Proceedings of 10th International Conference on Autonomic Computing, Jun. 26, 2013, pp. 69-82.

Padala, et al., "Automated Control of Multiple Virtualized Resources", In Proceedings of 4th ACM European Conference on Computer Systems, Apr. 1, 2009, pp. 13-26.

Shen, et al., "CloudScale: Elastic Resource Scaling for Multi-Tenant Cloud Systems", In Proceedings of 2nd ACM Symposium on Cloud Computing, Oct. 26, 2011, 14 pages.

Shivam, et al., "Automated and On-Demand Provisioning of Virtual Machines for Database Applications", In Proceedings of ACM SIGMOD International Conference on Management of Data, Jun. 11, 2007, pp. 1079-1081.

Soror, et al., "Automatic Virtual Machine Configuration for Database Workloads", In Proceedings of ACM SIGMOD International Conference on Management of Data, Jun. 9, 2008, pp. 953-966.

Ahmad, et al., "Predicting Completion Times of Batch Query Workloads using Interaction-Aware Models and Simulation", In Proceedings of 14th International Conference on Extending Database Technology, Mar. 21, 2011, pp. 449-460.

Akdere, et al., "Learning-based Query Performance Modeling and Prediction", In Proceedings of IEEE 28th International Conference on Data Engineering, Apr. 1, 2012, pp. 390-401.

(56) References Cited

OTHER PUBLICATIONS

Curino, et al., "Workload-Aware Database Monitoring and Consolidation", In Proceedings of ACM SIGMOD International Conference on Management of Data, Jun. 12, 2011, pp. 313-324.

Das, et al., "ElasTraS: An Elastic, Scalable, and Self-Managing Transactional Database for the Cloud", In Journal of ACM Transactions on Database Systems, vol. 38, Issue 1, Apr. 1, 2013, 45 pages.

Duggan, et al., "Performance Prediction for Concurrent Database Workloads", In Proceedings of ACM SIGMOD International Conference on Management of Data, Jun. 12, 2011, pp. 337-348.

Elmore, et al., "Characterizing Tenant Behavior for Placement and Crisis Mitigation in Multitenant DBMSs", In Proceedings of ACM SIGMOD International Conference on Management of Data, Jun. 22, 2013, pp. 517-528.

Ganapathi, et al., "Predicting Multiple Metrics for Queries: Better Decisions Enabled by Machine Learning", In Proceedings of IEEE International Conference on Data Engineering, Mar. 29, 2009, pp. 592-603.

Gupta, et al., "Enforcing Performance Isolation across Virtual Machines in Xen", In Proceedings of ACM/IFIP/USENIX International Conference on Middleware, Nov. 1, 2006, pp. 342-362.

Li, et al., "Robust Estimation of Resource Consumption for SQL Queries using Statistical Techniques", In Proceedings of the VLDB Endowment, vol. 5, Issue 11, Aug. 27, 2012, pp. 1555-1566.

Lim, et al., "Automated Control for Elastic Storage", In Proceedings of 7th International Conference on Autonomic Computing, Jun. 7, 2010, pp. 1-10.

Mozafari, et al, "Performance and Resource Modeling in Highly-Concurrent OLTP Workloads", In Proceedings of ACM SIGMOD International Conference on Management of Data, Jun. 22, 2013, pp. 301-312.

Narasayya, et al., "SQLVM: Performance Isolation in Multi-Tenant Relational Database-as-a-Service", In Proceedings of 6th Biennial Conference on Innovative Data Systems Research, Jan. 6, 2013, 9 pages.

Rousseeuw, et al., "Robust Regression and Outlier Detection", In John Wiley & Sons, Inc., Retrieved on: Feb. 10, 2015, 2 pages.

Spearman, C., "The Proof and Measurement of Association between Two Things", In American Journal of Psychology, vol. 15, No. 1, Jan. 1904, pp. 72-101.

Storm, et al., "Adaptive Self-Tuning Memory in DB2", In Proceedings of the 32nd International Conference on Very Large Data Bases, Sep. 12, 2006, pp. 1081-1092.

Tanenbaum, et al., "Computer Networks", Published on: Sep. 27, 2010 Available at: http://cse.hcmut.edu.vn/~minhnguyen/NET/Computer%20Networks%20-%20A%20Tanenbaum%20-%205th%20edition.pdf.

Theil, Henri, "A Rank-Invariant Method of Linear and Polynomial Regression Analysis", In Proceedings of Koninklijke Nederlandse Akademie Wetenschappen, vol. 53, Retrieved on: Feb. 10, 2015, 18 pages.

Trushkowsky, et al., "The SCADS Director: Scaling a Distributed Storage System under Stringent Performance Requirements", In Proceedings of 9th USENIX Conference on File and Stroage Technologies, Feb. 15, 2011, pp. 163-176.

Waldspurger, Carl A., "Memory Resource Management in VMware ESX Server", In Proceedings of 5th Symposium on Operating Systems Design and Implementation, vol. 36, Issue SI, Dec. 31, 2002, pp. 181-194.

Didona, et al., "Transactional Auto Scaler: Elastic Scaling of In-Memory Transactional Data Grids", In Proceedings of 9th ACM International Conference on Autonomic Computing, Sep. 18, 2012, 10 pages.

Curino, et al., "Relational Cloud: A Database-as-a-Service for the Cloud", In Proceedings of 5th Biennial Conference on Innovative Data Systems Research, Jan. 27, 2012, pp. 1-7.

Zhao, et al., "An Architecture Framework for Application-Managed Scaling of Cloud-Hosted Relational Databases", In Proceedings of WICSA/ECSA Companion Volume, Aug. 20, 2012, 8 pages.

Barker, et al., "ShuttleDB: Database-Aware Elasticity in the Cloud", In Proceedings of 11th International Conference on Autonomic Computing, Jun. 18, 2014, pp. 1-11.

Roy, et al., "Efficient Autoscaling in the Cloud using Predictive Models for Workload Forecasting", In Proceedings of IEEE 4th International Conference on Cloud Computing, Jul. 4, 2011, 8 pages.

"VMware Delivers a Modern Approach to Data Management High-Speed Data, Elastic Scale and Database-as-a-Service Capabilities for the Cloud Era", Published on: Feb. 1, 2013 Available at: http://www.vmware.com/files/pdf/vFabric_Solutions_brief.pdf.

"Postgres Plus Cloud Database", Published on: Jan. 6, 2014 Available at: http://get.enterprisedb.com/docs/Postgres_Plus_Cloud_Database_Getting_Started_Guide_20140121.pdf.

Sakr, et al., "Is Your Cloud-Hosted Database Truly Elastic?", In Proceedings of IEEE Ninth World Congress on Services, Jun. 28, 2013, pp. 444-447.

Gunarathne, Thilina, "Introduction to Amazon Web Services", Retrieved on: Feb. 5, 2015 Available at: http://salsahpc.indiana.edu/ICPAD/slides/Amazon_Web_Services_final.pdf.

"Amazon CloudWatch", Published on: Aug. 1, 2010. Available at: http://docs.aws.amazon.com/AmazonCloudWatch/latest/DeveloperGuide/acw-dg.pdf.

"DB2 Version 9.1 for z/OS, Administration Guide: Chapter 8: Monitoring and Controlling DB2 and Its Connections", Retrieved From: http://publib.boulder.ibm.com/epubs/pdf/dsnagk1e.pdf, Feb. 2013, 84 Pages.

"Dell DVD Store Database Test Suite: The DVD Store Version 2 (DS2), v2.1", Retrieved From: https://web.archive.org/web/20121229062954/http://linux.dell.com/dvdstore, Retrieved Date: Jan. 1, 2013, 1 Page.

"Effective Resource Management Using Oracle Database Resource Manager", In an Oracle White Paper, Jun. 2011, 24 Pages.

"Multi-Tenancy and Database as a Service (DBaaS) With ScaleArc iDB", Retrieved from: https://web.archive.org/web/20130403184251/http://www.scalearc.com/wordpress/wp-content/uploads/2013/01/ScaleArc_iDB_Whitepaper_Multi_Tenancy_And_DBaaS.pdf, Archieved on: Apr. 3, 2013, 7 Pages.

"Resource Governor", Retrieved from https://web.archive.org/web/20130113182316/http://msdn.microsoft.com/en-us/library/bb933866.aspx, Archieved Date: Jan 13, 2013, 4 Pages.

"TPC-H Benchmark", Retrieved from: http://www.tpc.org/tpch/, Retrieved Date: Mar. 5, 2018, 1 Page.

"Transaction Processing Performance Council, TPC-C Benchmark", Retrieved from: https://web.archive.org/web/20130116115815/http://www.tpc.org/tpcc, Retrieved Date: Jan. 29, 2013, 2 Pages.

"Using Oracle Database Resource Manager", In An Oracle White Paper, Apr. 2010, 26 Pages.

"VMware vSphereTM: The CPU Scheduler in VMware ESX 4.1", In the Technical Whitepaper, Retrieved Date: May 16, 2013, 22 Pages.

"Non-Final Office Action Issued in U.S. Appl. No. 13/747,686", dated Jan. 23, 2015, 16 Pages.

"Non-Final Office Action Issued in U.S. Appl. No. 13/747,686", dated Jun. 18, 2015, 18 Pages.

"Non-Final Office Action Issued in U.S. Appl. No. 13/747,686", dated Jan. 25.2016, 14 Pages.

"Notice of Allowance Issued in U.S. Appl. No. 13/747,686", dated Jun. 22, 2016, 15 Pages.

"Non-Final Office Action Issued in U.S. Appl. No. 14/270,966", dated Apr. 8, 2016, 24 Pages.

"Notice of Allowance Issued in U.S. Appl. No. 14/270,966", dated Nov. 9, 2016, 18 Pages.

"Non Final Office Action Issued in U.S. Appl. No. 15/252,972", dated Jun. 13, 2018, 18 Pages.

"Non-Final Office Action Issued in U.S. Appl. No. 15/435,269", dated Sep. 21, 2017, 23 Pages.

"Notice of Allowance Issued in U.S. Appl. No. 15/435,269", dated May 1, 2018, 13 Pages.

Armbrust, et al., "PIQL: Success-Tolerant Query Processing in the Cloud", In Proceedings of the VLDB Endowment, vol. 5, Issue 3, Nov. 1, 2011, pp. 181-192.

(56) References Cited

OTHER PUBLICATIONS

Bobrowski, Steve, "Optimal Multitenant Designs for Cloud Apps", In Proceedings of the IEEE 4th International Conference on Cloud Computing, Jul. 4, 2011, pp. 654-659.

Chandra, et al., "Surplus Fair Scheduling: A Proportional-Share CPU Scheduling Algorithm for Symmetric Multiprocessors", In Proceedings of the 4th Conference on Symposium on Operating System Design & Implementation, vol. 4, Oct. 23, 2000, 15 Pages.

Chi, et al., "iCBS: Incremental Cost-based Scheduling Under Piecewise Linear SLAs", In Proceedings of the VLDB Endowment, vol. 4, Issue 9, Jun. 1, 2011, pp. 563-574.

Duda, et al., "Borrowed Virtual Time (BVT) Scheduling: Supporting Latency-Sensitive Threads in a General-Purpose Scheduler", In Proceedings of the 17th ACM Symposium on Operating Systems Principles, Dec. 12, 1999, 16 Pages.

Elmore, et al., "Towards an Elastic and Autonomic Multitenant Database", In Proceedings of the 6th International Workshop on Networking Meets Databases, Jun. 12, 2011, 6 Pages.

Gao, et al., "Develop and Deploy Multi-Tenant Web-Delivered Solutions Using IBM Middleware: Part 3: Resource Sharing, Isolation and Customization in the Single Instance Multi-Tenant Application", Retrieved from: https://web.archive.org/web/20090329225045/http://www.ibm.com/developerworks/webservices/library/ws-multitenant/index.html?, Mar. 11, 2009, 6 Pages.

Goiri, et al., "Resource-Level Qos Metric for CPU-Based Guarantees in Cloud Providers", In Proceedings of the International Workshop on Grid Economics and Business Models, Aug. 31, 2010, 14 Pages.

Goyal, et al., "A Hierarchical CPU Scheduler for Multimedia Operating Systems", In Proceedings of the Second USENIX Symposium on Operating Systems Design and Implementation, Oct. 29, 1996, 15 Pages.

Gulati, et al., "mClock: Handling Throughput Variability for Hypervisor IO Scheduling", In Proceedings of the 9th USENIX conference on Operating systems design and implementation, Oct. 4, 2010, pp. 437-450.

Jain, et al., "A Quantitative Measure of Fairness and Discrimination for Resource Allocation in Shared Computer Systems", In Technical Report DEC-TR-301, Sep. 26, 1984, 38 Pages.

Jones, et al., "CPU Reservations and Time Constraints: Efficient, Predictable Scheduling of Independent Activities", In Proceedings of the Sixteenth ACM Symposium on Operating Systems Principles, Oct. 1, 1997, 14 Pages.

Krompass, et al., "Quality of Service Enabled Management of Database Workloads", In Bulletin of the IEEE Computer Society Technical Committee on Data Engineering, vol. 31, Issue 1, Mar. 2008, pp. 1-8.

Lang, et al., "Towards Multi-Tenant Performance SLOs", In Proceedings of the IEEE 28thTransactions on Knowledge and Data Engineering, vol. 26, Issue 6, Apr. 1, 2012, 12 Pages.

Liu, et al., "Scheduling Algorithms for Multiprogramming in a Hard-Real-Time Environment", In Journal of the Association for Computing Machinery, vol. 20, Issue 1, Jan. 1, 1973, pp. 46-61.

McNeil, Scott, "Schema As a Service for Extreme Consolidation", Retrieved From: https://blogs.oracle.com/oem/entry/schema_as_a_service_for, Mar. 8, 2013, 11 Pages.

Mercer, et al., "Processor Capacity Reserves: Operating System Support for Multimedia Applications", In Proceedings of the International Conference on Multimedia Computing and Systems, May 14, 1994, pp. 1-10.

Mozafari, et al., "Resource and Performance Prediction for Building a Next Generation Database Cloud", Retrieved from: http://db.csail.mit.edu/pubs/cidr-rel-cloud.pdf, Jan. 6, 2013, 4 Pages.

Nieh, et al., "The Design, Implementation and Evaluation of SMART: A Scheduler for Multimedia Applications", In Proceedings of the Sixteenth ACM Symposium on Operating System Principles, vol. 31, Issue 5, Oct. 1, 1997, 14 Pages.

Shreedhar, et al., "Efficient Fair Queuing Using Deficit Round-Robin", In Proceedings of the IEEE/ACM Transactions on Networking, vol. 4, Issue 3, Jun. 1996, 11 Pages.

Shue, et al., "Performance Isolation and Fairness for Multi-Tenant Cloud Storage", In 10th US EN IX Symposium on Operating Systems Design and Implementation, Oct. 8, 2012, pp. 1-14.

Smith, et al., "Scheduling With Advanced Reservations", In Proceedings of the 14th International Parallel and Distributed Processing Symposium, May 1, 2000, 6 Pages.

Steere, et al., "A Feedback-Driven Proportion Allocator for Real-Rate Scheduling", In Proceedings of the 3rd Symposium on Operating Systems Design and Implementation, vol. 99, Feb. 22, 1999, 15 Pages.

Stoica, et al., "A Proportional Share Resource Allocation Algorithm for Real-Time, Time-Shared Systems", In Proceedings of the 17th IEEE Real-Time Systems Symposium, Dec. 4, 1996, 12 Pages.

Stoica, et al., "On the Duality Between Resource Reservation and Proportional Share Resource Allocation", In Proceedings of the Multimedia Computing and Networking, vol. 3020, Feb. 1997, 8 Pages.

Stonebraker, Michael, "Operating System Support for Database Management", In Magazine Communications of the ACM, vol. 24, Issue 7, Jul. 1, 1981, pp. 412-418.

Surksum, Kenneth Van., "The CPU Scheduler in VMware vSphere 5.1", In Technical Whitepaper of VMware, Jan. 24, 2013, 26 Pages.

Surtani, Manik, "Data-as-a-Service: The Data Fabric for Clouds", Retrieved from: https://web.archive.org/web/20130312232944/http://java.dzone.com/articles/data-service-data-fabric, May 19, 2010, 3 Pages.

Urgaonkar, et al., "Resource Overbooking and Application Profiling in Shared Hosting Platforms", In Journal of the ACM Transactions on Internet Technology, vol. 9, Issue 1, Feb. 1, 2009, 16 Pages.

Waldspurger, et al., "Lottery and Stride Scheduling: Flexible Proportional-Share Resource Management", In the Technical Report, Sep. 1995, 151 Pages.

Wilkins, Mark, "Oracle Reference Architecture—Cloud Foundation Architecture", In White Paper of Oracle, Release 3.0, Nov. 2011, 60 Pages.

Xiong, et al., "Intelligent Management of Virtualized Resources for Database Systems in Cloud Environment", In Proceedings of the IEEE 27th International Conference on Data Engineering, Apr. 11, 2011, pp. 87-98.

"Final Office Action Issued in U.S. Appl. No. 15/252,972", dated Dec. 31, 2018, 16 Pages.

"Notice of Allowance Issued in U.S. Appl. No. 15/252,972", dated Jun. 26, 2019, 17 Pages.

* cited by examiner

AUTOMATIC DEMAND-DRIVEN RESOURCE SCALING FOR RELATIONAL DATABASE-AS-A-SERVICE

BACKGROUND

Relational Database-as-a-Service (DaaS) platforms support the abstraction of a resource container that guarantees a fixed amount of resources (e.g., two virtual cores, 4 GB of memory, 100 disk IOPS and 1 TB disk space) and a cost per billing interval (e.g., 50 cents per hour). Tenants are responsible to select a container size suitable for workloads. To take advantage of cloud elasticity, DaaS platforms tenants must estimate and manually change the database container size. The tenant is charged for the largest container size used in the billing interval and pays the summation of costs for each billing interval.

Since resource demand cannot be measured, a problem is to estimate demand for database workloads. However, a challenge arises due to the complexity of database engines and how multiple resources interact. For example, if the offered load increases, it does not necessarily mean that that adding more resources will significantly improve query latencies, particularly if queries are mostly waiting for locks on shared data items. Similarly, adding more memory might reduce the need for I/O (input/output) and increase the CPU (central processing unit) demand since more data can be cached. Moreover, when container sizes vary significantly in resources and cost, the penalty for incorrect demand estimation can be high—it results in either poor performance if demand is underestimated or higher monetary cost if demand is overestimated. Still further, most tenants of a DaaS cannot afford to hire sophisticated database administrators with the expertise necessary to make judicious decisions whether and when to scale resources.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides the capability in a Database-as-a-Service (DaaS) to enable the auto-scale of container sizes on behalf of tenants. The architecture provides an abstraction that enables tenants to reason about monetary budget and query latency, rather than resource provisioning. An auto-scaling module automatically determines a container size for a subsequent billing interval based on available budget, and observing latencies and resource utilization in the billing intervals from the immediate past. An aspect of the auto-scaling module is the capability to estimate the resource demands from the measurable database engine telemetry (e.g., counters and statistics reported by the database server or the DaaS) such as resource utilization, waits for resources, etc.

A set of signals are derived from database engine telemetry and combined to significantly improve accuracy of demand estimation for database workloads. In a more specific implementation, resource demands can be estimated for arbitrary SQL (structured query language) workloads in a relational database management system (RDBMS).

More specifically, an abstraction is provided that enables a DaaS service provider to support auto-scaling of container resources on behalf of the tenant. Tenants can specify inputs to govern the behavior of the auto-scaling logic. Inputs can be in the form of latency goals, monetary budget, coarse-grained performance sensitivity, etc. These inputs enable the tenant to control monetary costs. The service provider's responsibility is to auto-scale the size of a single container, that is, adjust the resources allocated to a single container which hosts the tenant database. This is different from some existing solutions for virtual machines (VMs), for example, which add or remove VMs from a cluster based on user-specified thresholds. Contrariwise, the disclosed architecture resizes the same container. In addition, the user does not need to provide rules for container resizing, which is automatically managed by the disclosed architecture as well.

A technique is provided that improves the estimation accuracy of resource demands for a variety of workloads (e.g., SQL) without any prior knowledge of the workload. A technique is also provided to identify a set of statistically-generated signals from the production telemetry of a relational DaaS. A decision logic is provided that combines the multiple signals to improve accuracy of resource demand estimation.

The utilization of the abstraction and improved estimation of resource demands in a relational DaaS provides an end-to-end solution for automated demand-driven resource scaling on behalf of the tenant.

The disclosed architecture can be implemented as a database-as-a-service system, comprising: an auto-scaling module configured to automatically compute sizes of containers in database servers for subsequent billing intervals based on telemetry from the database servers; and at least one hardware processor configured to execute computer-executable instructions in a memory, the instructions executed to enable the auto-scaling module.

The disclosed architecture can be implemented as a database-as-a-service method, comprising acts of: estimating resource demands of containers for databases based on production telemetry; and automatically scaling container sizes of the containers for a billing interval on behalf of a tenant based on changes in the estimated resource demands.

The disclosed architecture can be implemented as a database-as-a-service system, comprising: means for estimating resource demands of containers for databases based on production telemetry; and means for automatically scaling container sizes of the containers for a billing interval on behalf of a tenant based on changes in the estimated resource demands.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
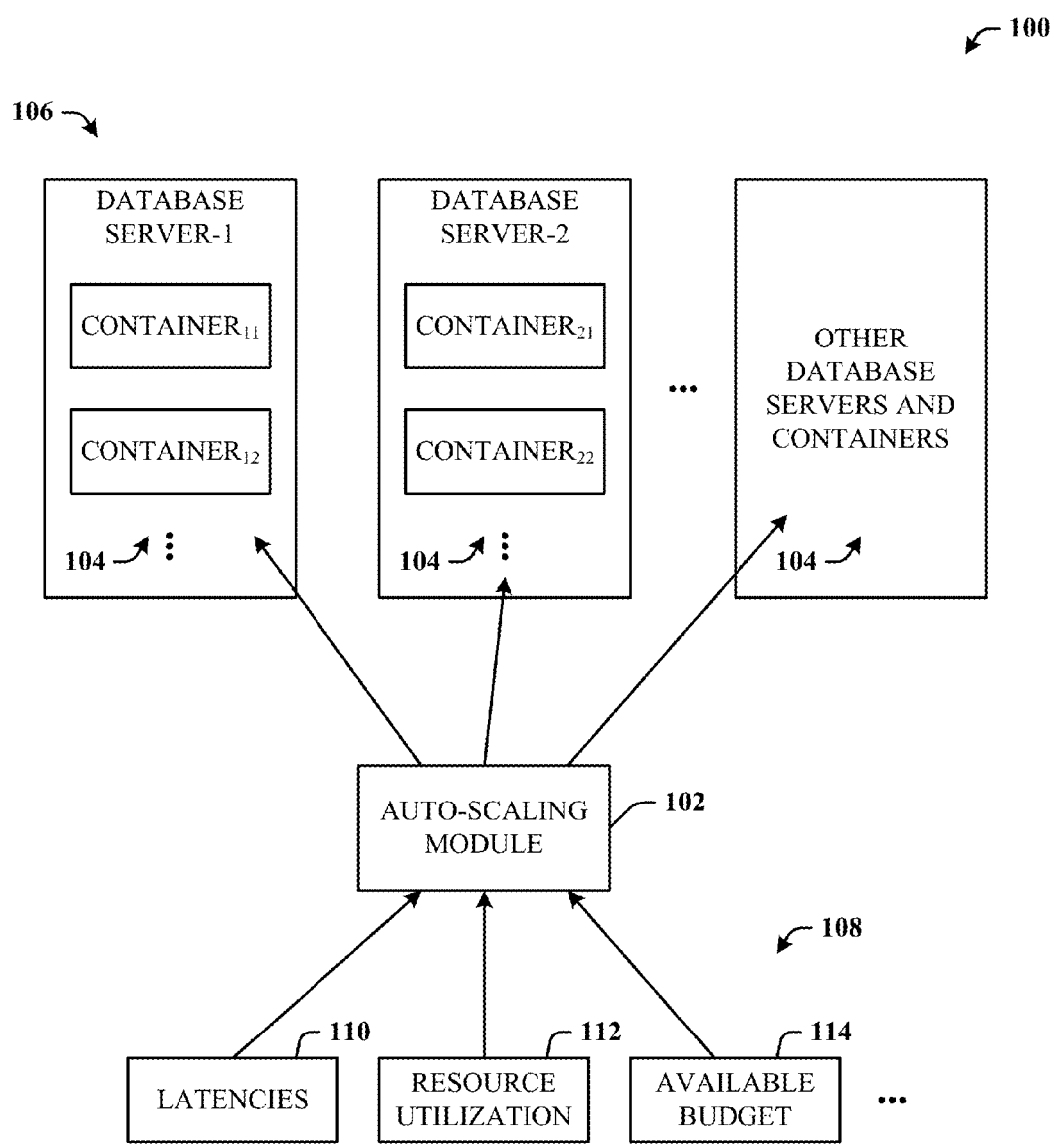
FIG. 1 illustrates a database-as-a-service (DaaS) system in accordance with the disclosed architecture.

Many enterprises deploy mission-critical databases in database-as-a-service (DaaS) environments. DaaS offer elasticity, pay-per-use, and high availability. Since DaaS environments are multi-tenant, performance predictability through resource isolation is a requirement for such mission-critical databases. Commercial DaaS offerings now support resource isolation through logical or physical containers. The container can be a virtual machine (VM) dedicated to a tenant database or a logical container (e.g., a SQL database). Regardless of the specific container abstraction supported, each container guarantees a fixed set of resources (the fixed set of resources referred to as the container size).

Relational DaaS platforms support the abstraction of a resource container that guarantees a fixed amount of resources. That is, the resource containers are not elastic by design. One approach for a DaaS platform to support elasticity is by allowing a tenant to change the container size for a tenant's database, over time. For instance, if there are periods of high load interspersed by periods of low loads, a larger container size can be manually provisioned during the periods of high load, thus providing better performance, while a smaller container size can be manually provisioned during periods of low load, result in cost savings.

To benefit from cloud elasticity, the tenant has to determine when to scale the container size. Application-agnostic approaches rely on resource utilization as the primary driver for scaling decisions. For instance, if resource utilization is high (e.g., 80% I/O (input/output) utilization in the current container with 100 I/O operations per second (IOPS)), then scale-up the container; similarly, low resource utilization implies scale down. However, high resource utilization does not necessarily correspond to a demand for more resources. When container sizes vary significantly in resources and cost, the penalty for incorrect demand estimation can be poor performance if demand is underestimated or higher monetary cost if demand is overestimated.

The disclosed architecture enables a DaaS to auto-scale container sizes (automatically) on behalf of tenants. In a more specific implementation, resource demands can be estimated for arbitrary SQL (structured query language) workloads in a relational database management system (RDBMS). The architecture focuses on the "scale-up" form of auto-scaling, where the size of a single container is changed over time. This is different from a "scale-out" approach of some existing auto-scaling techniques which change the number of containers (e.g., VMs). The "scale-out" approach re-partitions the workload as the number of containers change. The "scale-up" approach is supported in DaaS environments and enables databases contained in a single server to utilize elasticity without partitioning the database.

The disclosed architecture provides an abstraction that enables tenants to reason about monetary budget and query latency, rather than resource provisioning and, utilizes generic telemetry and execution characteristics of a tenant workload, which is available for all tenants and does not require tenant-specific human input. For example, a resource wait, which is the amount of time a tenant request waits for a logical or physical resource, is a signal, since significant waits for resources can imply the workload would benefit from additional resources.

One aspect of the disclosed architecture is a model utilized to automatically estimate the database's resource demands and accordingly scale (up or down) the container size allocated to the database. A set of statistically-robust signals (signals that provide improved performance and overall accuracy for the desired purpose) can be derived from database engine telemetry (referred to as production telemetry), and these signals can be combined to significantly improve accuracy of demand estimation for database workloads. Signals are obtained that can tolerate noise, which is inevitable in system telemetry. Additionally, domain knowledge of database engine internals is used to systematically design a decision logic to combine multiple signals to greatly reduce the number of inaccurate estimations of high (or low) demand.

Intuitively, if there are multiple weak signals of high demand for a resource (such as utilization and waits), this increases the likelihood of the demand actually being high. Furthermore, the fact that a DaaS platform can observe telemetry of large numbers of tenants with very different workloads and resource demands enables the analysis of service-wide telemetry to improve the demand-estimation logic (e.g., to determine meaningful and suitable thresholds for the input signals).

Additionally, tenants can specify latency goals for associated tenant applications. These goals can be used to further reduce costs. If latency goals are met, a smaller container can be allocated even if there is demand for a larger container. Further, where latency goals might not be met due to issues beyond resources, such as poorly-written application code, the container size can be increased only if there is resource demand, even when the latency goals are not being met. (Note that tenants do not need to specify a throughput goal.) When the offered load increases, the unmet resource demand and query latencies provide the feedback to the auto-scaling logic. This functionality raises the abstraction of a DaaS by enabling tenants to reason about budget and query latency rather than resource provisioning.

In addition to estimating resource demands, an end-to-end auto-scaling solution must cater to a number of practical challenges. The disclosed architecture embodies an online budget allocation strategy that allows periods of high resource demand (where the budget is consumed at a rate higher that the average rate) while ensuring that the total cost does not exceed the budget.

The disclosed architecture exhibits a technical effect of improved usability. That is, the tenant no longer needs to be involved in manual container sizing for workloads, since this can now be achieved automatically on behalf of the tenant. Moreover, disclosed architecture exhibits a technical effect of enhanced reliability by automatically attaining budgetary requirements imposed by the tenant. Furthermore, the disclosed architecture exhibits a technical effect of reduced human error in that auto-scaling is now handled automatically and algorithmically for the tenant, as well as reduced error in estimating high demand. Still further, the disclosed architecture exhibits a technical effect of memory conservation in database server farms by more efficiently managing memory allocations for tenant workloads. Yet another technical effect is improved resource allocation, generally, on a database server or across multiple servers.

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a database-as-a-service (DaaS) system 100 in accordance with the disclosed architecture. The system 100 can include an auto-scaling module 102 configured to automatically determine container sizes of containers 104 in database servers 106. The container sizes can be determined for a subsequent billing interval based on telemetry 108 from the database servers 106. The telemetry 108 can comprise latencies 110, resource utilization 112, and available budget 114.

As described in greater detail hereinbelow and in association with other figures, the auto-scaling module 102 can further comprise a telemetry manager configured to collect the telemetry 108 of tenant databases of the database servers 106, and a resource demand estimator configured to estimate resource demands that warrant a larger container or a smaller container. The resource demand estimator can be configured to transform the telemetry into signals used to estimate the resource demands of multiple workloads of the database servers 106. Additionally, the resource demand estimator can be configured as a rules-based logic having one or more thresholds for each of the signals to determine tenant state in terms of each signal.

The auto-scaling module 102 can further comprise a budget manager configured to compute available budget for each billing interval, which is smaller than a budgeting period, based on budget input criteria. The auto-scaling module 102 can further comprise an auto-scaling logic configured to output container sizing actions to a database management fabric based on a combination of raw and derived signals (telemetry), available budget, and demand estimates.

Figure 2:
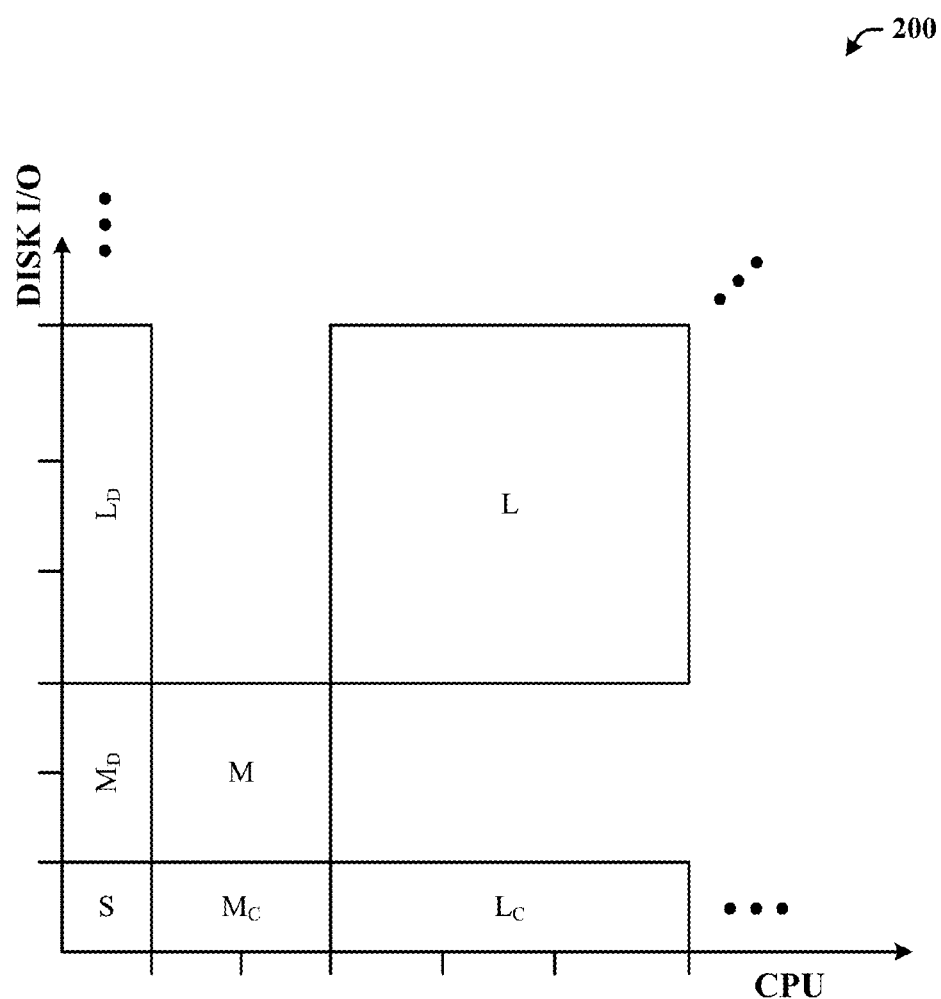
FIG. 2 illustrates a chart showing that container sizes can be scaled independently in each resource dimension or in lock-step for all resources.

FIG. 2 illustrates a chart 200 showing that container sizes can be scaled independently in each resource dimension or in lock-step for all resources. The chart 200 demonstrates the scaling of container sizes using two resource dimensions, CPU and Disk I/O, as examples, though a resource container may comprise many additional resource dimensions, such as memory, network bandwidth, and number of parallel threads. Container sizes (S, M, L, . . . ) scale both the CPU (on the x-axis) and Disk I/O (on the y-axis) in the same proportion. That is, M has 2× (times) larger allocation and L has 3× larger allocation for both CPU and Disk I/O compared to S. S, $M_C$, $L_C$, . . . (the C subscript for CPU) and S, $M_D$, $L_D$, . . . (the D subscript for Disk I/O) represent container scaling along CPU and Disk I/O dimensions, respectively. For instance, the standard tiers in some existing DaaS implementations proportionally increase resources while high memory, high CPU, and high I/O instances scale resources along a specific dimension. Workloads having demand in one resource dimension can benefit, if containers can be scaled independently in each dimension.

While challenging for tenants to reason about resource demands for tenant workloads, it is easier for tenants to relate to application-level latency goals and monetary constraints such as a monthly budget for the database. The auto-scaling of resources based on demand enables tenants to relate to latency goal and monetary constraints.

In principle, an auto-scaling logic can automatically scale the container sizes purely based on demand. However, customers (also referred to as tenants) may want "knobs" (user-configurable adjustments) that enable tailoring of the behavior of this automated logic to customer databases. As previously indicated, a DaaS platform hosts variety of tenants, from small departmental applications with modest latency requirements to line-of-business applications requiring interactive query latency. While scaling purely based on demand may be desirable for performance-critical applications, it may not be cost-effective for budget-conscious tenants. Accordingly, the disclosed architecture provides a set of knobs, which the tenants can optionally set, to control the costs and behavior of the auto-scaling logic.

With respect to a budget, many tenants have an operating budget for their databases. Such tenants can specify a budget for longer periods of time (called the budgeting period, e.g., a month). The budget can be modeled as a hard constraint. When a budget is specified, the disclosed auto-scaling logic selects the smallest container sufficient to meet the resource demands and has a cost less than the available budget. If the budget is not constrained, containers can be selected based only on demand. Note that an alternative is to model the budget as a soft constraint such that the summation of cost of containers for the budgeting period may exceed the budget but remains within a configurable threshold.

With respect to latency goals, many applications have a latency goal for the database back-end. Such tenants can provide goals for the average or $95^{th}$ percentile latency. The latency goals enable the auto-scaling logic to provide resources sufficient to achieve the latency goals, thus reducing costs when resource demands require a larger container size but the latency goals can be achieved using a smaller container size. For instance, an application involving interactive user activity may specify a $95^{th}$ percentile latency of one hundred milliseconds (ms). On the other hand, a small departmental web application may be satisfied with an average latency of one thousand milliseconds, thereby potentially achieving lower costs if the latency goals can be met with a smaller container. As previously described, latency goals of an application might not be met due to issues beyond resources, such as poorly-written application code. Therefore, latency goals are not a guarantee of performance, but rather a knob to control costs.

With respect to coarse-grained performance sensitivity, for tenants without precise latency goals, a coarse-grained knob indicates latency-sensitivity for a given application. This knob can be a continuous value (e.g., between 0 and 1). However, for convenience, a small set of discrete steps can be provided, such as: HIGH, MEDIUM, and LOW with the default value set to MEDIUM. Intuitively, for a tenant with LOW sensitivity, the auto-scaling logic is less aggressive in scaling up (and more aggressive in scaling down) than for a tenant with HIGH sensitivity, thereby potentially reducing costs.

The inputs supported by the disclosed auto-scaling abstraction can also be extended to include a customer-specified minimum and maximum container sizes or a schedule to select certain container sizes. For instance, assuming container sizes as XS (extra-small, which is smaller than S), S (small), M (medium), L (large), and XL (extra-large, which is larger than L) in increasing order of size and cost, the customer may specify the minimum container size as S and maximum container size as L. This input constrains the auto-scaling logic so the logic never selects containers XS and XL. Similarly, the customer can specify a schedule, such as: Monday 9 AM-12 Noon (select M); everyday 12 Noon-5 PM (select L); and all other times, automatically select the container sizes, for example.

Figure 3:
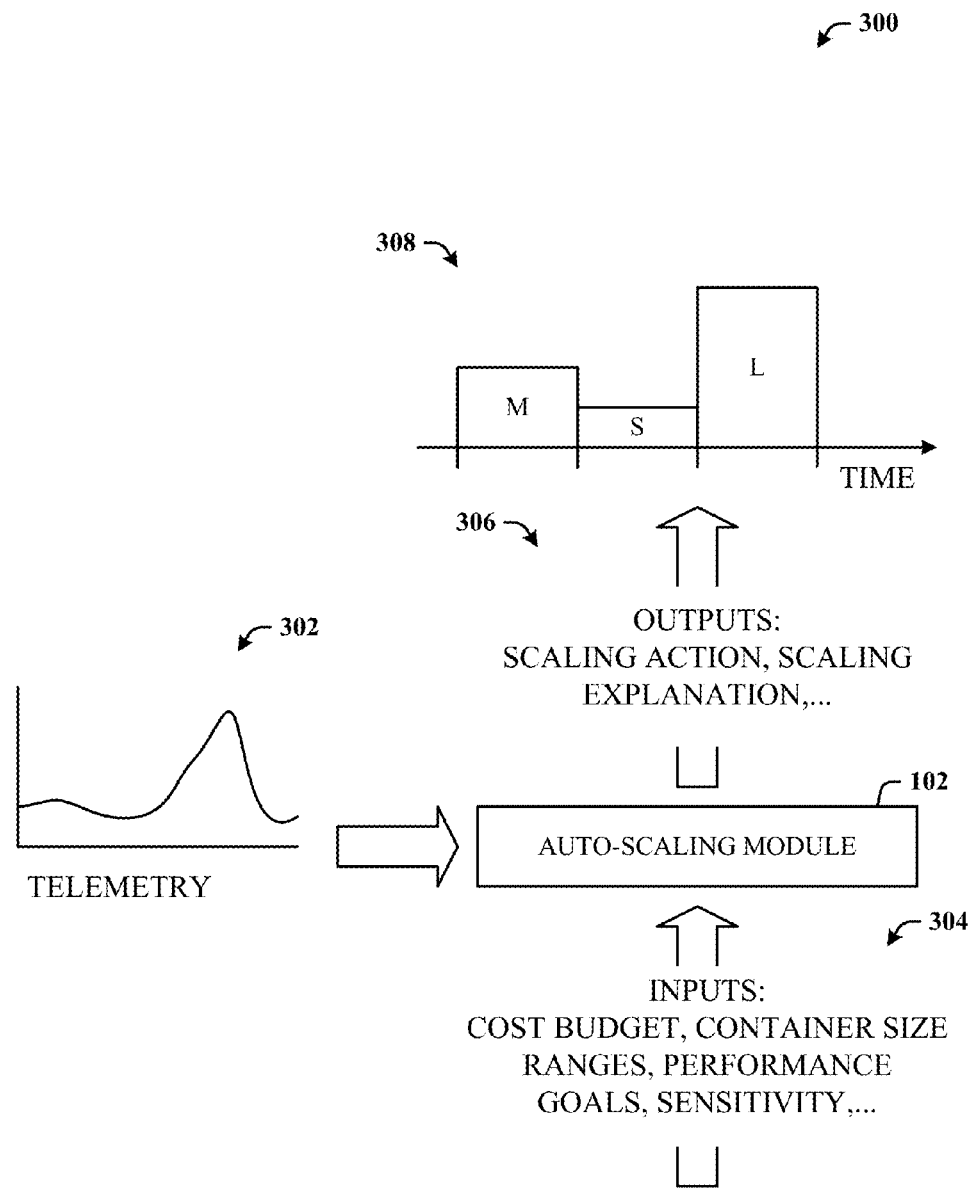
FIG. 3 illustrates an auto-scaling abstraction in a DaaS when using discrete steps for coarse-grained performance sensitivity.

FIG. 3 illustrates an auto-scaling abstraction 300 in a DaaS when using discrete steps for coarse-grained performance sensitivity. The auto-scaling module 102 receives as input the changing telemetry 302, and other inputs 304 such as cost budget, container size ranges, performance goal, sensitivity, and so on. Outputs 306 of the auto-scaling module 102 can then comprise scaling actions, scaling explanations, etc., over time according to discrete steps 308 of MEDIUM, SMALL and LARGE, for example.

Figure 4:
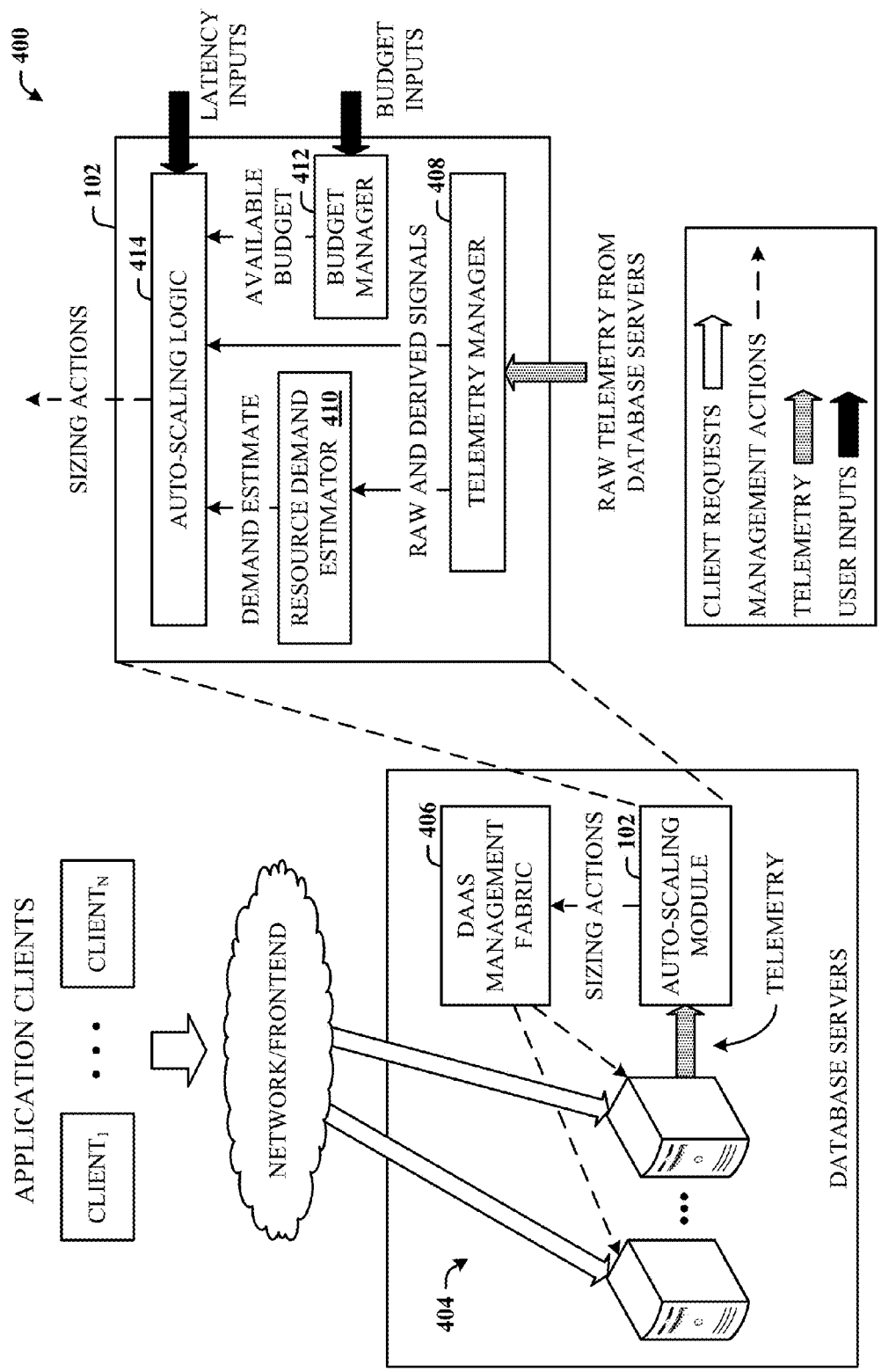
FIG. 4 illustrates a simplified architecture of a DaaS service that supports auto-scaling of resources.

FIG. 4 illustrates a simplified architecture of a DaaS service 400 that supports the auto-scaling of resources. The service 400 improves the accuracy of resource demand estimation for a variety of workloads (e.g., SQL) served by the DaaS service 400.

The service 400 comprises a collection of servers 404 that host the tenant databases and serve requests. (FIG. 4 does not show other components of the service 300, such as management servers, gateways, and load balancers, for example.) Each database server (of the servers 404) in the service 400 hosts a set of containers (similar to containers 104 of FIG. 1), one for each tenant database. The co-location of specific containers at a server (of the servers 404) is determined by a management fabric 406 of the service 400. Additionally, the DaaS service 400 collects detailed counters (called production telemetry) for each container.

The auto-scaling module 102 comprises at least three major components (shown in the blow-up to the right): a telemetry manager 408, which collects raw telemetry for each tenant database, and selects a subset of counters from the hundreds of counters in the telemetry to be used as signals to estimate demand; a resource demand estimator 410, which uses the raw and derived signals from the telemetry manager 408 to estimate the demand for each of the resources comprising the container; and, a budget manager 412, which judiciously translates the budget for the budgeting period into a budget for each billing interval for which a container is chosen.

The disclosed architecture comprises an "online" technique (i.e., a technique without knowledge of future workload patterns), which allocates sufficient budget for each billing interval that meets bursts in resource demands while ensuring the budget constraints for the longer budgeting period. The auto-scaling logic 414 combines the output of the three components (telemetry manager 408, resource demand estimator 410, and budget manager 412) to transform the raw telemetry and high-level tenant-specified knobs (of latency inputs and budget inputs) into container sizing actions supported by the DaaS, while dynamically scaling container sizes with time-varying resource demands.

More specifically, with respect to the telemetry manager 408, mature DBMSs (database management systems) monitor and report hundreds of counters that comprise the production telemetry. The telemetry manager 408 transforms this raw telemetry into signals that can be used to estimate, with high accuracy, resource demands of a variety of workloads.

First, a small set of counters is identified. Domain knowledge of database engines is used to identify the relevant signals. Second, there may be significant amounts of 'noise' in the telemetry arising from the inherent variance and spikes in workloads, transient system activities such as checkpoints interacting with workload, etc. Simple statistical measures such as averages can easily be "dominated" by a few large outlier values. Therefore, as a general rule, statistical measures are used that are robust (substantially immune) to outliers. Robustness to outliers is defined using the notion of the breakdown point of an estimator. Intuitively, an estimator's breakdown point is the percentage of incorrect observations (e.g., arbitrarily large deviations) an estimator can handle before giving an incorrect result.

Example "breakdown point": Given m independent variables and associated realizations $x_1, \ldots, x_m$, use $\bar{x}=(\Sigma_{i=1}^{m} x_i)/m$ to estimate the mean. However, this estimator has a breakdown point of zero, because $\bar{x}$ can be made arbitrarily large just by changing any one of the $x_i$. In contrast, the median of a distribution has a breakdown point of 50%, which is the highest breakdown point possible.

Signals from telemetry of the database servers 404 can comprise latency, resource utilization, and wait statistics, for example. Some signals obtained from telemetry are robust aggregates on counters obtained from the raw telemetry, while other signals are derived robust statistical measures over the counters.

With respect to latency, the database servers 404 track latency for every request completed for a tenant. The latencies can be aggregated either to the percentile or the average as specified in the latency goals. With respect to resource utilization, resource utilization is a measure of how much of the resources the tenant's workload is currently using, and is a signal for resource demand. The database server reports utilization for the key resources, such as CPU, memory, and disk I/O for each tenant. The telemetry manager 408 collects these values at a fine granularity, such as once every few seconds, for example, and computes robust statistical measures, such as the median, over different time granularities, ranging from minutes to hours, which comprise the utilization signals.

With respect to wait statistics, resource utilization provides little information whether the workload needs more resources. By contrast, if tenant's requests wait for a specific resource, this implies that the tenant has unmet demand for that resource. Most mature DBMSs track the amount the time a tenant's request spends waiting within the database server. The telemetry manager 408 tracks the magnitude of the wait times and the percentage waits (i.e., the time spent waiting for a resource as a percentage of the total waits for an interval of time). The telemetry manager 408 exposes robust aggregates of these raw wait statistics as signals for demand estimation. Note that the magnitude and percentage waits can both be used for demand estimation. For instance, large values of CPU waits might be observed. However, if CPU waits are insignificant compared to waits due to acquiring application-level locks, then even though there might be demand for more CPU, adding more CPU is not likely to significantly improve latencies. Similarly, CPU waits might comprise 100% of the waits. However, if the magnitude is small, then demand for CPU might not be high.

DBMSs can report wait statistics categorized into different wait types which the telemetry manager 408 collects. Each wait type can be associated to a (logical or physical) resource for which the request waited. Using these mapping rules, the wait times can be mapped to the resource to determine the total time the tenant's requests waited for that resource. Waits can be classified into a broad set of classes for the key physical and logical resources: CPU, memory, disk I/O, log I/O, locks, and system. For instance, a DBMS (e.g., a SQL server) may classify the wait times of a workload into more than three hundred wait types. Each wait type can be associated with a resource. For example, the signal wait time is the time when a thread has been signaled and ready to use the CPU to the time when the thread was actually allocated the CPU, and hence, comprises CPU waits.

In addition to the (aggregated) "raw" telemetry information, trends in latency, resource utilization, etc., are analyzed, as well as correlation between signals, such as resource waits with performance. Both correlation and trends can be tracked for different purposes. Trends identify changes to specific metrics (e.g., resource waits) over time, which enable early identification of changes in the workload or its resource demands. For trends, the absolute value of the trend matters (i.e., the increase is rapid vs. slow). Correlation characterizes the dependence between two signals (e.g., CPU waits and latencies). Large correlation values help to identify the main bottleneck(s) for a given workload, independently of whether there is an overall increase or decrease in these counters over time. These signals are particularly useful if the tenants care about tail latencies (such as the 95$^{th}$ percentile), since tail latencies react faster to unmet demand.

With respect to identifying trends over time, a first class of derived signals used can be trends in a subset of monitored counters—such as latency, resource utilization, or waits—over time. For instance, if there is a trend in the recent history that the latency is degrading with time, it might be an early signal that latency goals might be violated in the immediate future. Similarly, an increasing trend over time in the wait times associated with a specific resource can be indicative of unmet resource demand. Given the immediate time scale of resource scaling actions, the focus can be on detecting short-term trends with sufficient confidence. Therefore, simple, but robust, linear models are sufficient, as opposed to non-linear or time-series models which are better suited for long-term trends.

A challenge in detecting trends is the noise in the underlying data on which trends are computed. The data itself might be inherently noisy and there might not be a statistically-significant trend, in which case the trend must be ignored. In addition, the trend measure should be robust to outliers (data points away from a cluster).

In one implementation that addresses the problem of noisy data, the Theil-Sen estimator can be used for robust detection of the trend line. Given n tuples ⟨X, Y⟩, the Thiel-Sen estimator computes the slope of the line passing through each pair of tuples $(x_i, y_i)$ and $(x_j, y_j)$ as $$m = \frac{y_j - y_i}{x_j - x_i}$$

and uses me median of $m_i$ as the slope of the trend line. While there exist estimators with even higher breakdown points, the Theil-Sen estimator has the advantages of being simple, efficient to compute, and not requiring additional tuning parameters.

The $O(n^2)$ slopes can be used as computed by the estimator in two ways. First, the median value is the slope of any existing trend in the data. Second, the set of slopes can be used to test for the existence of a significant trend in the data. That is, if there is indeed a (linear) trend in the (non-noisy) data points, then this implies that (the vast majority of) the slopes between them have the same sign. Therefore, a trend may only be "accepted" if at least α% of the slopes are positive or α% of the slopes are negative. In one implementation, α=70 can be used.

With respect to detecting correlation, if there is demand for a resource which exceeds the allocation, making the resource a bottleneck, then in the time intervals preceding that event, there is typically an increase in the utilization of that resource or the wait times associated with that resource, or both. A strong correlation between the degrading latencies and the resource utilization and/or wait counters is indicative of demand in the resource which, if met, can significantly improve latencies. Therefore, this correlation measure can be employed as an additional signal.

In one implementation, the Spearman rank coefficient can be utilized, denoted by ρ, as the correlation measure. Spearman's rank correlation is a statistical measure of the correlation of ranks or orders of two ranked data sets which assesses how well the relationship between two variables can be described using a monotonic function. That is, the dependence need not be linear for Spearman's coefficient to detect it, which makes it suitable since for arbitrary database applications, the correlation of utilization, waits, and latencies is often non-linear.

Given two ranked data sets X and Y, ρ is computed as the Pearson's coefficient on the ranks of the x and y values. The value of ρ lies between −1 and 1; ρ=1 implies perfect correlation, ρ=−1 implies perfect negative correlation, and ρ=0 implies no correlation between the two orders. A side-effect of using the Spearman coefficient is that outliers due to data noise become much less of an issue because each value is first mapped to the space of ranks, which bounds the degree to which an outlier value can deviate from the average.

With respect to the resource demand estimator, each signal obtained from the telemetry manager 408 may be weakly predictive of resource demands, and hence, may not be used in isolation to estimate demand with high accuracy. Therefore, these signals can be combined to improve accuracy of demand estimation. If multiple weakly-predictive signals predict high demand for a resource, the likelihood of the demand actually being high, is increased.

One approach is to use statistical learning techniques to infer a model using training data obtained from production telemetry. For instance, machine learning techniques can be used to estimate resource demand from the input signals. Machine learning techniques might be useful with careful selection of features, the learners, and training data, for example.

Another approach is to combine these signals using domain knowledge of the internals of the database engine and how different resources interact. A decision logic is employed that comprises a manually-constructed hierarchy of rules that use multiple signals to determine the resource demands of the tenant's workload. The rule-based logic employs a set of thresholds for each signal to determine the tenant's state in terms of each signal, in isolation. Each rule combines the states obtained from each signal to determine the overall resource demand. By traversing this hierarchy of rules, the logic decides to add more resources (i.e., scale-up) if there is high demand or take away unused resources (i.e., scale-down) if the demand is low.

Recall that given the discrete container sizes and that at any instant of time, the tenant is associated with a container size, a problem is to estimate if there is demand for a larger container or the demand can be met by a smaller container.

When estimating demand, in each resource dimension, a determination is made as to how many steps in container sizes are needed to increase (or decrease). Production telemetry can be used across thousands of tenants as a guide through this process. By assigning container sizes to tenant's resource utilization values, it can be observed that of the total number of container size change events due to resource demands changing, 90% result in the container size changing by 1 step, and step sizes 1 and 2 together comprise 98% of the changes. Therefore, estimating demand may be constrained to change the container size by 0 (no change), 1, or 2 steps.

There are several pragmatic benefits to this rule-based approach. First, it is found to be robust when testing across a wide range of very different workloads. Second, once thresholds are applied to the signals, the signals are transformed from a continuous value domain to a categorical value domain where each category has easy-to-understand semantics. This makes the rules easier to construct, debug, maintain, extend, and explain. For instance, using categories with well-defined semantics allows the auto-scaling logic to provide an "explanation" of its actions. These explanations provide the (often unsophisticated) end-users with a simple reasoning for scaling actions. The container sizing decisions result from analyzing tens of signals. However, the model traverses a hierarchy of rules with well-understood semantics for each path. An explanation is a concise way of explaining the path the model traversed when recommending a container size. For instance, if the model identifies a CPU bottleneck which in turn scales up the container size, then an explanation of the form "Scale-up due to a CPU bottleneck" is generated. If the model recommended a scale-up but the budget constraints disallow it, then the model can generate an explanation of the form "Scale-up constrained by budget". For an expert administrator, the model also exposes the raw telemetry as well as the signals used to facilitate detailed diagnostics. Moreover, since the rules can be easily understood by humans, the rules are also easily extensible to consider many more combinations of signals to make the model more robust and increase accuracy.

Resource demand estimation can comprise the steps of determining the thresholds for each signal and the utilization of production telemetry from a DaaS to determine these thresholds, and some example rules to detect high and low demand.

With respect to determining thresholds, model understanding (knowledge) includes an explanation of how the thresholds are determined and how the thresholds are set for each signal. The thresholds transform the continuous signal values to categories with well-understood semantics. This categorization is primarily for ease of understanding and exposition, and is not fundamental to the model, though the underlying thresholds are inherent to the rules.

Setting thresholds for latencies and resource utilization can be straightforward. If the tenant specifies a latency goal, it becomes the threshold to determine if the latency is GOOD (i.e., goals are met) versus the latency is BAD (i.e., goals are not being met). Similarly, for the underlying database engine the DaaS platform utilizes, there already exist well-known thresholds and rules that system administrators use to categorize the resource utilization as LOW, MEDIUM, and HIGH.

It is beneficial to use a systematic approach for setting thresholds for the wait statistics in order that the categories are meaningful. Production telemetry collected from thousands of real tenant databases across the service can be used to determine these thresholds. The rationale is that if resource demands are high, a wait for that resource will also be high. In order to address occasional noise, there may be a clear separation between wait distributions for low and high demand utilization by analyzing data from thousands of tenants.

Percentile values from these distributions can be used to categorize waits as HIGH (e.g., if CPU waits exceed fifteen hundred seconds), or LOW (e.g., if CPU waits are less than twenty seconds). Note that the actual percentile for each container size, resources type, and cluster configuration, can be different.

Additionally, the thresholds for percentage waits can be categorized to be SIGNIFICANT or NOT SIGNIFICANT. Again, production telemetry can be used to set thresholds for percentage waits. In one implementation, the $80^{th}$ percentile of percentage waits for CPU and Disk I/O is in the range 20%-30% while the corresponding number for high utilization is in the range 70%-90%, which demonstrates this separation in values. These percentile values can be used from these distributions to set thresholds to categorize percentage waits.

Following is a description of detecting high demand using knowledge of the database engine internals to craft a set of rules using the signals to estimate whether demand is high enough to require a scale-up. A first step is to identify the scenarios that correspond to high demand. A few illustrative scenarios are: (a) if utilization is HIGH and wait times are HIGH with SIGNIFICANT percentage waits; (b) if utilization is HIGH, wait times are HIGH, percentage waits are NOT SIGNIFICANT, and there is a SIGNIFICANT increasing trend over time in utilization and/or wait; and (c) if utilization is HIGH, wait times are MEDIUM, percentage waits are SIGNIFICANT, and there is a SIGNIFICANT increasing trend over time in utilization and/or waits. Note that all of the scenarios combine two or more signals. Moreover, if one of the signals is weak (e.g., wait time in not HIGH), additional signals (e.g., trends) can be considered.

Note that the scenarios are stated in terms of the signals and associated categories. In addition to being easy to explain, these scenarios can be directly encoded as predicate rules in the model which if true for a resource implies high demand for that resource. Further note that memory and disk I/O interact. That is, if memory is a bottleneck, the memory bottleneck will result in higher I/O utilization and waits. Since memory waits and tracked independent of I/O waits, if both resources are identified as a bottleneck, the model recommends scaling-up both resources.

Estimating whether demand is low is similar to high demand estimation, except that the tests are for the other end of the spectrum of categories for the signals. For instance, the rules test for LOW utilization or LOW waits, and non-positive trends in resource waits or utilization.

To address the estimation of low memory demand in a database server, a "ballooning" technique can be used that slowly reduces the memory allocated to a tenant to observe its impact on disk I/O. If the memory can be reduced all the way to the next smaller container size without causing a significant increase in disk I/O demand, memory demand is determined as low. If ballooning results in an increase in disk I/O demand, the tenant is reverted to the current memory allocation. In one implementation, to determine when to trigger ballooning so that the impact of latencies can be minimized, ballooning is triggered only when the demand for all other resources is LOW. This approach minimizes the risk of adversely affecting the tenant's query latencies.

With respect to the budget manager 412, a tenant can specify a budget B for a budgeting period comprising n billing intervals. The budget manager 412 determines the available budget ($B_i$) for each billing interval, which is considerably smaller than the budgeting period, such that $\Sigma_{i=1}^{n} B_i \leq B$. Let $C_{min}$ and $C_{max}$ be the respective costs per billing interval for the cheapest and the most expensive containers. The budget manager 412 ensures $B_i \geq C_{min}$ in order to allocate the cheapest container within the budget. An analogy of the budget management problem can be made to the traffic shaping problem in computer networks, where a network router shapes a flow, allowing periodic bandwidth bursts, while providing a minimum steady bandwidth, and ensuring that the flow conforms to a total bandwidth allocation. One approach to managing the surplus budget (B−n× $C_{min}$) is now described.

Figure 5:
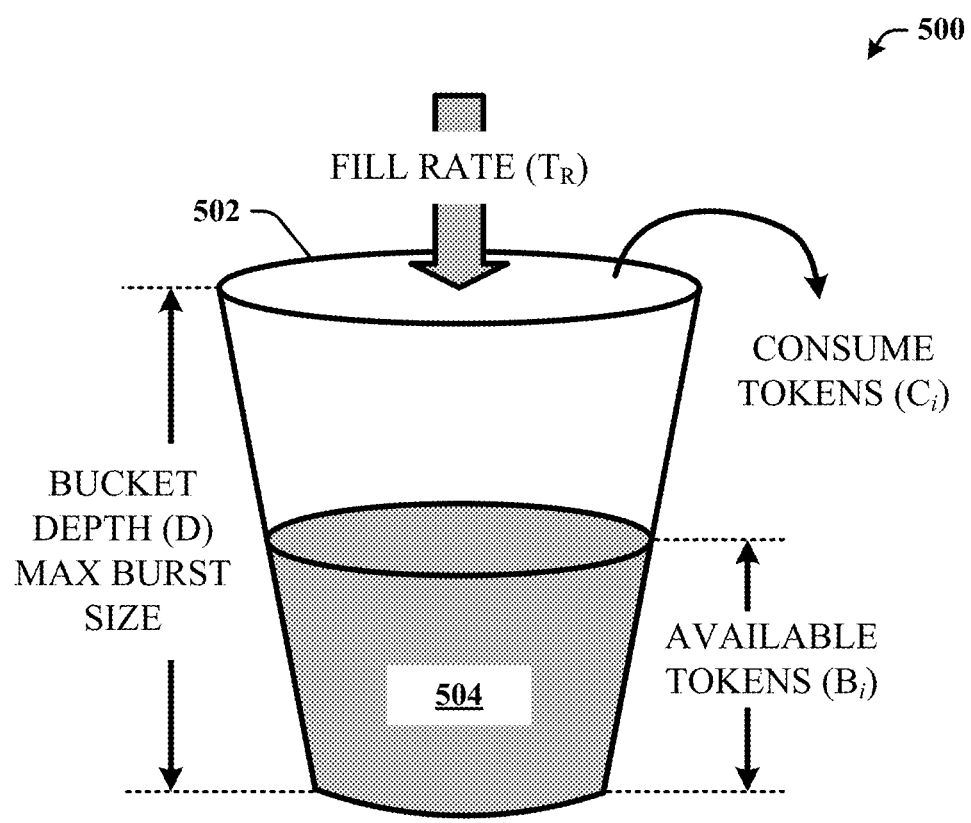
FIG. 5 illustrates a token bucket algorithm for budget allocation.

FIG. 5 illustrates a token bucket algorithm 500 for budget allocation. The token bucket algorithm 500 uses a fixed capacity bucket 502, of depth D, to hold tokens 504 where D is the maximum burst size. The bucket 502 is initialized with $T_I$ tokens and periodically refreshed at a fixed rate, called the fill rate $T_R$, which is the guaranteed average bandwidth.

The budget manager 412 configures the token bucket 502 by setting $T_R$, $T_I$, and D to meet the requirements. At any instant, the number of tokens 504 in the bucket is the available budget $B_i$. At the end of the $i^{th}$ billing interval, $T_R$ tokens are added and $C_i$ tokens are subtracted, where $C_i$ is the cost for the $i^{th}$ interval. Setting $T_R = C_{min}$ ensures that $B_i \geq C_{min}$. Setting $D = B - (n-1) \times C_{min}$ guarantees $\Sigma_{i=1}^{n} C_i \leq B$. The value set for $T_I$ determines how aggressive to be in consuming the budget during periods of high demand. An aggressive bursting strategy sets $T_I = D$ (i.e., start the budgeting period with a full bucket). If there is a sustained high demand such that the largest container is allocated for m intervals, the bucket 502 will be empty when $$m = \frac{B - (n-m) \times C_{min}}{C_{max}}$$

Starting from the $(m+1)^{th}$ interval to the $n^{th}$ interval, the available budget will be $B_i = C_{min}$ and the tenant can only use the cheapest container, which might not be enough to meet the demands. An alternative is to set $T_I = K \times C_{max}$, where K<m and set $$T_R = \frac{B - T_I}{n - 1}.$$

This conservative setting ensures that the maximum usage burst is limited to at most K intervals of using $C_{max}$ plus any surplus unused tokens unused from the past (i.e., this setting saves more for intervals later in the budgeting period at the expense of limiting costs early on). By analyzing the distribution of high demand periods from production telemetry, the value can be set to K sufficient to meet a certain fraction (e.g., the $95^{th}$ percentile) of the bursts.

The auto-scaling logic 414 determines the container size for the next billing interval by monitoring latencies, estimated resource demands, and the available budget. If the tenant has high demand for a resource and the latency is BAD, or there is a SIGNIFICANT trend increasing latency with time, then the logic 414 recommends scaling-up, if sufficient budget is available. If latency is GOOD and not degrading, and estimated resource demands are LOW, then the logic 414 recommends scale-down; otherwise, no action is taken.

The resource demand estimator 410 provides the desired setting for each resource, which comprises the desired container size. The auto-scaling logic 414 uses the available budget ($B_i$) and the desired container size to find the cheapest container, among the set of DaaS containers, with resources greater or equal to the desired container on all resource dimensions and price $C_i \leq B_i$. If the desired container is constrained by the available budget, then the most expensive container with price less than $B_i$ is selected.

This process is an iterative search over the set of containers supported by the DaaS. Note that resource demand estimation is at the level of individual resources. Therefore, if the workload only has demand for one type of resource, such as CPU, then the estimation logic recommends increasing the CPU allocation in the desired container. If the DaaS supports the scaling of containers in each resource dimension, this multi-dimension scaling can be utilized by the auto-scaling logic 414.

If the container size recommended is different from the current container size, the model issues a container resize command to the management fabric 406 of the DaaS which then executes the resize operation. This container resize operation can be an online operation in most services.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
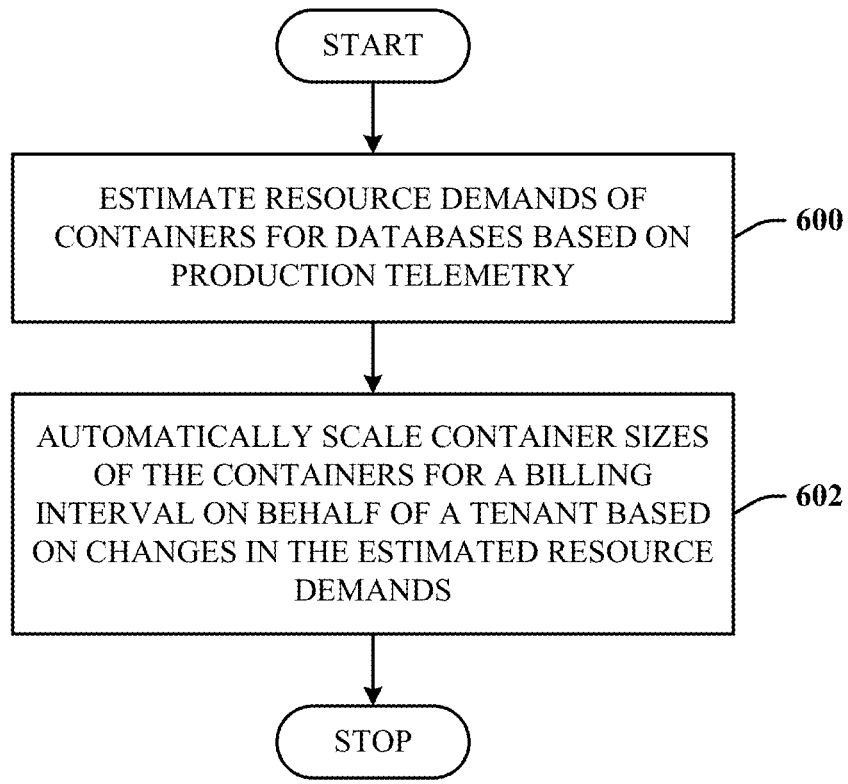
FIG. 6 illustrates a method in accordance with the disclosed architecture.

FIG. 6 illustrates a DaaS method in accordance with the disclosed architecture. At 600, resource demands of containers are estimated for databases based on production telemetry (e.g., telemetry 108 of FIG. 1). At 602, container sizes of the containers for a billing interval are automatically scaled on behalf of a tenant based on changes in the estimated resource demands.

The method can further comprise governing behavior of the automatic scaling based on inputs specified by a tenant. The method can further comprise identifying statistically-robust signals from the production telemetry. The method can further comprise combining multiple signals to improve accuracy of the estimation of the resource demands.

The method can further comprise controlling monetary costs based on monetary budget, performance sensitivity, and latency goals. The method can further comprise selecting a subset of counters of the production telemetry from which signals can be derived to estimate resource demand. The method can further comprise tracking correlations between signals and trend metrics of counters in the production telemetry.

Figure 7:
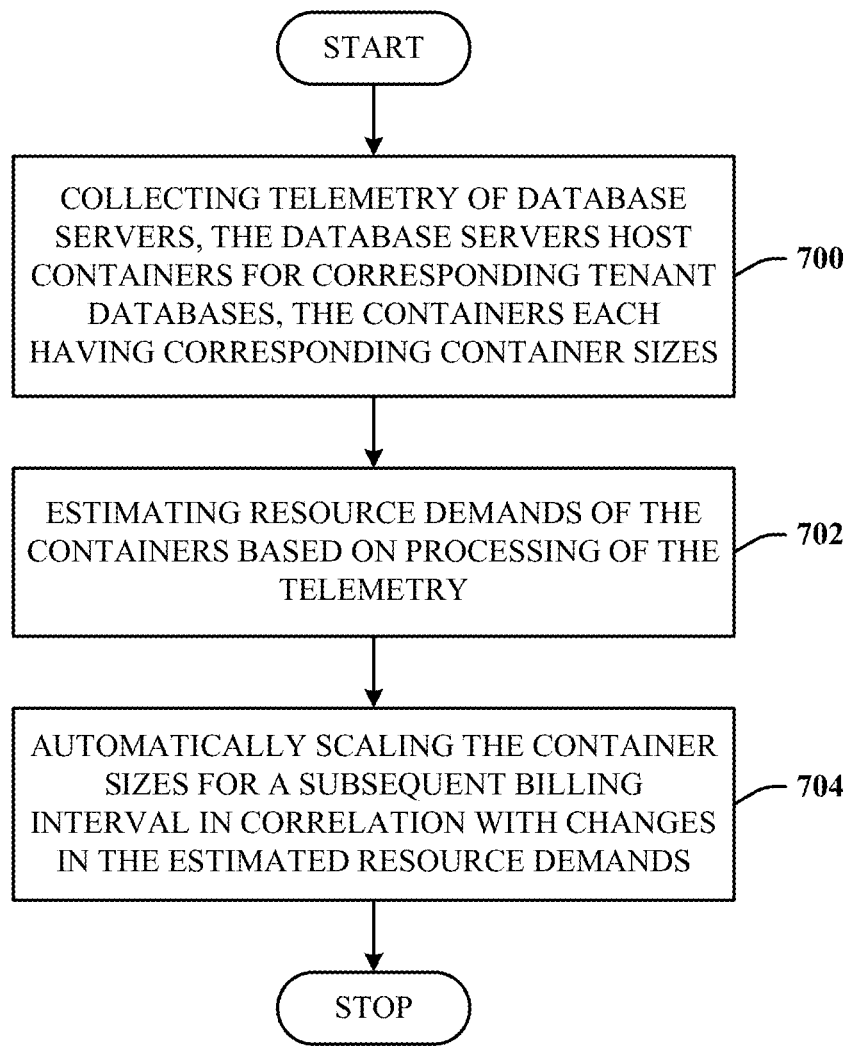
FIG. 7 illustrates an alternative method in accordance with the disclosed architecture.

FIG. 7 illustrates an alternative DaaS method in accordance with the disclosed architecture. At 700, telemetry of database servers is collected. The database servers host containers for corresponding tenant databases, and the containers each have corresponding container sizes. At 702, resource demands of the containers are estimated based on processing of the telemetry. At 704, the container sizes are automatically scaled for a subsequent billing interval, and the container sizes are scaled in correlation with changes in the estimated resource demands.

The method can further comprise governing behavior of the automatic scaling based on inputs specified by a tenant. The method can further comprise combining multiple signals to improve accuracy of the estimation of the resource demands. The method can further comprise tracking correlations between signals and trend metrics of counters in the telemetry. The method can further comprise deriving signals for resource demand estimation of a container sizes based on a selection of counters from the telemetry.

Figure 8:
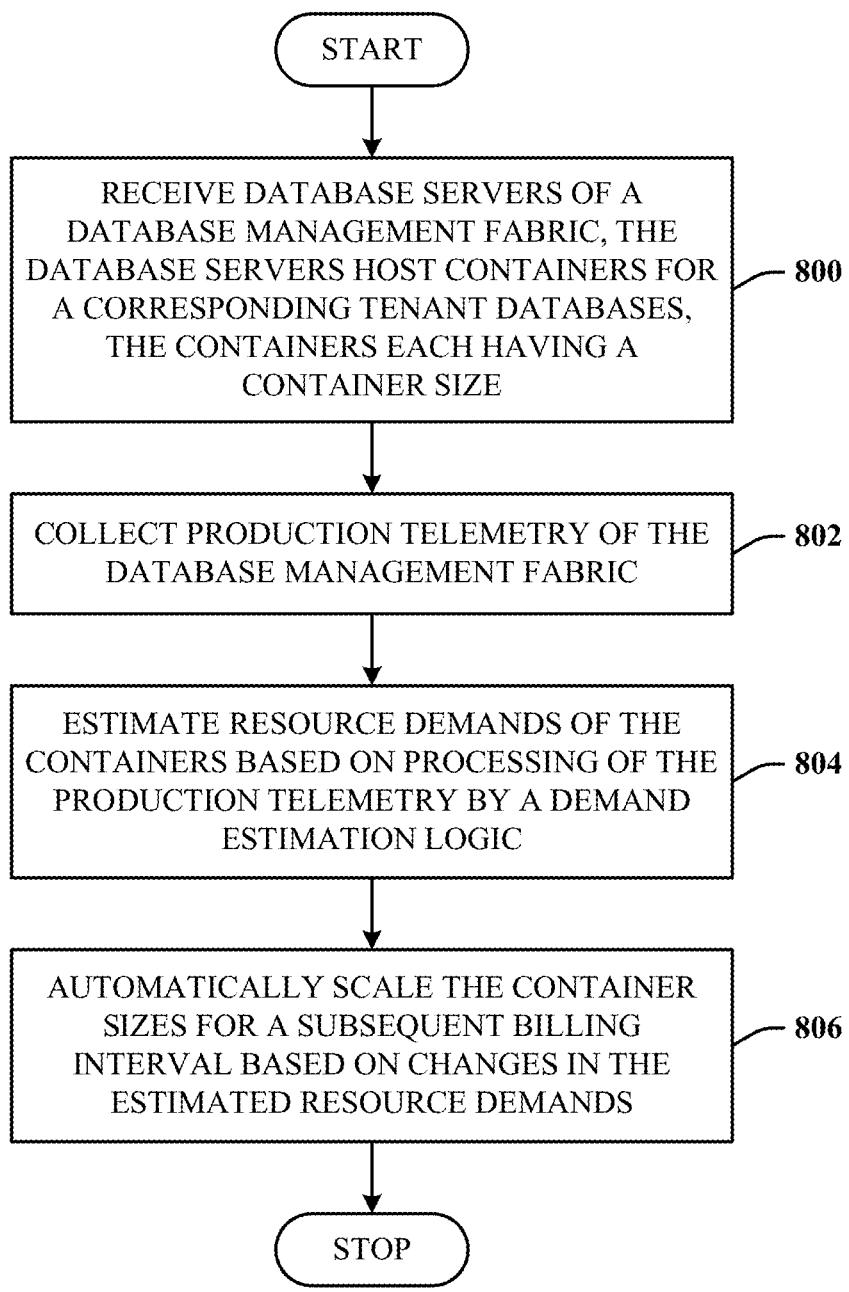
FIG. 8 illustrates an alternative method in accordance with the disclosed architecture.

FIG. 8 illustrates an alternative DaaS method in accordance with the disclosed architecture. At 800, database servers of a database management fabric are received. The database servers host containers for a corresponding tenant databases, the containers each having a container size. At 802, production telemetry of the database management fabric is collected. At 804, resource demands of the containers are estimated based on processing of the production telemetry by a demand estimation logic. At 806, the container sizes are automatically scaled for a subsequent billing interval based on changes in the estimated resource demands.

As used in this application, the term "component" is intended to refer to a computer-related entity, either hardware, a combination of software and tangible hardware, software, or software in execution. For example, a component can be, but is not limited to, tangible components such as one or more microprocessors, chip memory, mass storage devices (e.g., optical drives, solid state drives, magnetic storage media drives, etc.), computers, and portable computing and computing-capable devices (e.g., cell phones, tablets, smart phones, etc.). Software components include processes running on a microprocessor, an object (a software entity that maintains state in variables and behavior using methods), an executable, a data structure (stored in a volatile or a non-volatile storage medium), a module (a part of a program), a thread of execution (the smallest sequence of instructions that can be managed independently), and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
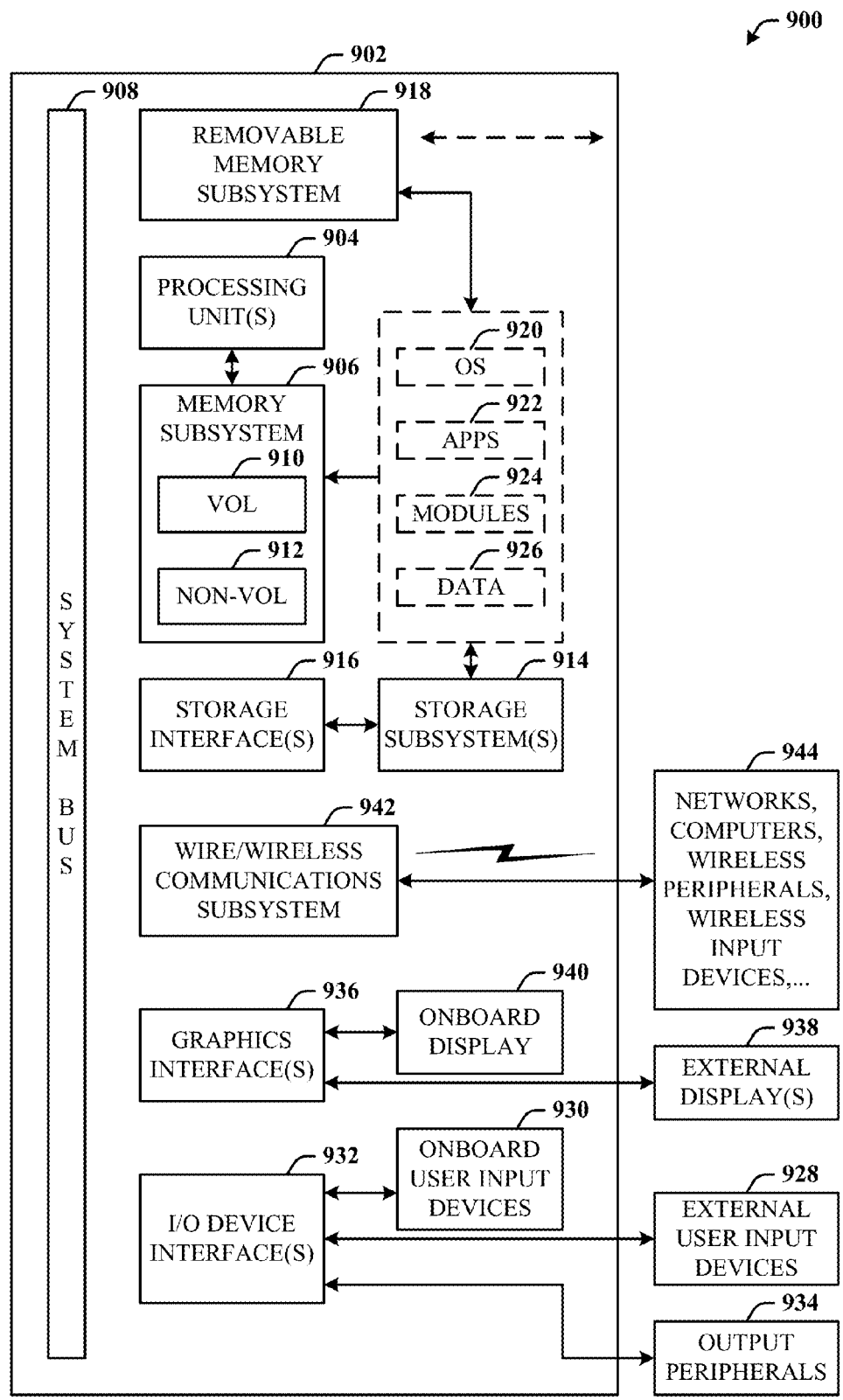
FIG. 9 illustrates a block diagram of a computing system that executes automated demand-driven resource scaling in a DaaS in accordance with the disclosed architecture.

Referring now to FIG. 9, there is illustrated a block diagram of a computing system 900 that executes automated demand-driven resource scaling in a DaaS (e.g., relational) in accordance with the disclosed architecture. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc., where analog, digital, and/or mixed signals and other functionality can be implemented in a substrate.

In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel implementation also can be realized in combination with other program modules and/or as a combination of hardware and software.

The computing system 900 for implementing various aspects includes the computer 902 having microprocessing unit(s) 904 (also referred to as microprocessor(s) and processor(s)), a computer-readable storage medium (where the medium is any physical device or material on which data can be electronically and/or optically stored and retrieved) such as a system memory 906 (computer readable storage medium/media also include magnetic disks, optical disks, solid state drives, external memory systems, and flash memory drives), and a system bus 908. The microprocessing unit(s) 904 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 902 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 906 can include computer-readable storage (physical storage) medium such as a volatile (VOL) memory 910 (e.g., random access memory (RAM)) and a non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the microprocessing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components and circuits. The storage subsystem(s) 914 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The operating system 920, one or more application programs 922, other program modules 924, and/or program data 926 can include items and components of the system 100 of FIG. 1, the container sizes and scaling of the chart 200 of FIG. 2, items and components of the abstraction 300 of FIG. 3, items, flow, and components of the architecture 400 of FIG. 4, flow of the bucket algorithm 500 of FIG. 5, and the methods represented by the flowcharts of FIGS. 6-8, for example.

Generally, programs include routines, methods, data structures, other software components, etc., that perform particular tasks, functions, or implement particular abstract data types. All or portions of the operating system 920, applications 922, modules 924, and/or data 926 can also be cached in memory such as the volatile memory 910 and/or non-volatile memory, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 902, and include volatile and non-volatile internal and/or external media that is removable and/or non-removable. For the computer 902, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 902, programs, and data using external user input devices 928 such as a keyboard and a mouse, as well as by voice commands facilitated by speech recognition. Other external user input devices 928 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 902, programs, and data using onboard user input devices 930 such a touchpad, microphone, keyboard, etc., where the computer 902 is a portable computer, for example.

These and other input devices are connected to the microprocessing unit(s) 904 through input/output (I/O) device interface(s) 932 via the system bus 908, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

The disclosed architecture can be implemented as a database-as-a-service system, comprising: means for estimating resource demands of containers for databases based on production telemetry; and means for automatically scaling container sizes of the containers for a billing interval on behalf of a tenant based on changes in the estimated resource demands.

The disclosed architecture can be implemented as an alternative database-as-a-service system, comprising: means for collecting telemetry of database servers, the database servers host containers for corresponding tenant databases, the containers each having corresponding container sizes; means for estimating resource demands of the containers based on processing of the telemetry; and, means for automatically scaling the container sizes for a subsequent billing interval in correlation with changes in the estimated resource demands.

The disclosed architecture can be implemented as an alternative database-as-a-service system, comprising: means for receiving database servers of a database management fabric, the database servers host containers for a corresponding tenant databases, the containers each having a container size; means for collecting production telemetry of the database management fabric; means for estimating resource demands of the containers based on processing of the production telemetry by a demand estimation logic; and, means for automatically scaling the container sizes for a subsequent billing interval based on changes in the estimated resource demands.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A database-as-a-service system, comprising: an auto-scaling module configured to:
   automatically compute container sizes of containers in database servers for subsequent billing intervals based on telemetry from the database servers, wherein the container sizes are based on a fixed capacity of resources within a container, wherein the telemetry comprises an available budget for a billing interval, resource utilization, and, for each request for a resource in the container, a time spent waiting for the resource as a percentage of total waits for all resources in the container for an interval of time; and
   automatically scale the container sizes of the containers for a subsequent billing interval on behalf of a tenant based on the telemetry; and at least one hardware processor configured to execute computer-executable instructions in a memory, the instructions executed to enable the auto-scaling module.

2. The system of claim 1, further comprising a telemetry manager configured to collect the telemetry of tenant databases of the database servers.

3. The system of claim 1, wherein the telemetry comprises at least one of latencies or available budget.

4. The system of claim 1, further comprising a resource demand estimator configured to estimate resource demands that warrant a larger container or a smaller container.

5. The system of claim 4, wherein the resource demand estimator is configured to transform the telemetry into signals used to estimate the resource demands of multiple workloads of the database servers.

6. The system of claim 5, wherein the resource demand estimator is configured as a rules-based logic having one or more thresholds for each of the signals to determine tenant state in terms of each signal.

7. The system of claim 1, further comprising a budget manager configured to compute the available budget for each billing interval, which is smaller than a budgeting period, based on budget input criteria.

8. The system of claim 1, further comprising an auto-scaling logic configured to output container sizing actions to a database management fabric based on a combination of raw and derived signals, available budget, and demand estimates.

9. A database-as-a-service method comprising:
   estimating resource demands of one or more containers for databases based on production telemetry, wherein the production telemetry comprises an available budget for a billing interval, resource utilization, and, for each request for a resource in the one or more containers, a time spent waiting for the resource as a percentage of total waits for all resources in the one or more containers for an interval of time; and
   automatically scaling container sizes of the one or more containers for a subsequent billing interval on behalf of a tenant based on changes in the estimated resource demands, wherein the container sizes are based on a fixed capacity of resources within a container.

10. The method of claim 9, further comprising governing behavior of the automatic scaling based on inputs specified by the tenant.

11. The method of claim 9, further comprising identifying statistically-robust signals from the production telemetry.

12. The method of claim 9, further comprising combining multiple signals to improve accuracy of the estimated resource demands.

13. The method of claim 9, further comprising controlling monetary costs based on monetary budget, performance sensitivity, and latency goals.

14. The method of claim 9, further comprising selecting a subset of counters of the production telemetry from which signals can be derived to estimate resource demands.

15. The method of claim 9, further comprising tracking correlations between signals and trend metrics of counters in the production telemetry.

16. A database-as-a-service method, comprising acts of:
   collecting telemetry of database servers, wherein the database servers host containers for corresponding tenant databases, the containers each having corresponding container sizes, wherein the telemetry comprises an available budget for a billing interval, resource utilization, and, for each request for a resource in the containers, a time spent waiting for the resource as a percentage of total waits for all resources in the containers for an interval of time;

estimating resource demands of the containers based on processing of the telemetry; and automatically scaling the container sizes for a subsequent billing interval in correlation with changes in the estimated resource demands, wherein the container sizes are based on a fixed capacity of resources within a container.

17. The method of claim 16, further comprising governing behavior of the automatic scaling based on inputs specified by a tenant.

18. The method of claim 16, further comprising combining multiple signals to improve accuracy of the estimated resource demands.

19. The method of claim 16, further comprising tracking correlations between signals and trend metrics of counters in the telemetry.

20. The method of claim 16, further comprising deriving signals for estimating the resources demands of the container sizes based on a selection of counters from the telemetry.

* * * * *